United States Patent [19]

Cuk

[11] Patent Number: 5,078,078
[45] Date of Patent: Jan. 7, 1992

[54] TRANSFORMER INTERNAL FAULT WARNING INDICATOR

[75] Inventor: Nikola Cuk, North Vancouver, Canada

[73] Assignee: Powertech Labs Inc., Canada

[21] Appl. No.: 631,547

[22] Filed: Dec. 21, 1990

[51] Int. Cl.⁵ .................. G01L 19/12; G08B 5/18; H01H 9/50
[52] U.S. Cl. .................. 116/272; 116/266; 361/37
[58] Field of Search .............. 116/218, 220, 266, 268, 116/270, 272, 283; 73/744; 361/37; 340/646

[56] References Cited

U.S. PATENT DOCUMENTS

| | | | |
|---|---|---|---|
| 1,485,013 | 2/1924 | Blakeslee | 374/152 |
| 1,640,309 | 8/1927 | Buchholz | 361/37 |
| 1,682,498 | 8/1928 | Gano | 374/152 |
| 1,709,723 | 4/1929 | Hill et al. | 116/266 |
| 2,403,372 | 7/1946 | Jackson | 374/152 |
| 2,490,933 | 12/1949 | Tornquist et al. | 374/152 |
| 3,077,777 | 2/1963 | Book | 374/152 |
| 3,286,726 | 11/1966 | Guy | 73/744 |
| 4,174,673 | 11/1979 | Tung et al. | 116/266 |
| 4,195,528 | 4/1980 | Takahashi | 73/579 |
| 4,773,350 | 9/1988 | Lyons | 116/214 |
| 4,831,957 | 5/1989 | Goans | 116/272 |

FOREIGN PATENT DOCUMENTS

| | | | |
|---|---|---|---|
| 1117735 | 11/1961 | Fed. Rep. of Germany | 361/37 |
| 477788 | 1/1938 | United Kingdom | 361/37 |

Primary Examiner—William A. Cuchlinski, Jr.
Assistant Examiner—W. Morris Worth
Attorney, Agent, or Firm—Townsend and Townsend

[57] ABSTRACT

A warning indicator provides an indication that a transient over-pressure condition has occurred in a transformer. The indicator takes into account small or slow pressure changes and only indicates pressure surges. The internal arcing warning indicator comprises an opening in a casing of a transformer, a movable piston over the opening with a retainer to retain the piston over the opening, the piston having at least one small aperture therein to allow slow increases and decreases of pressure within the transformer without the piston moving, and an indicator attached to the piston, the indicator providing an indication that the piston has moved a predetermined distance and retaining the indication until reset.

5 Claims, 1 Drawing Sheet

TRANSFORMER INTERNAL FAULT WARNING INDICATOR

BACKGROUND OF THE INVENTION

The present invention relates to a warning indicator of internal faults in power transformers used on energy supply systems. More specifically, the present invention relates to a device which reacts to a transient over-pressure occurring invariably as a consequence of an internal arcing fault within a power transformer.

Nearly all pole mounted distribution transformers are protected by a fused cutout which are operated by a lineman to energize particular circuits and which open in the event of an overload or internal fault. If there is an overload in the system and the fuse operates, then a lineman can easily spot the open cutout and knows that the transformer adjacent the fuse is out of service. If the fault is downstream of the transformer, then once that fault has been corrected it is a simple matter for the lineman to re-fuse the cutout to re-energize the circuit. If, however, the fault is in the transformer, then closing the cutout will produce arcing within the transformer, and in extreme cases explosion of the transformer can occur causing damages and possible injury to the lineman.

It is known that there is a transient pressure surge inside of a transformer whenever an internal arcing fault occurs. This is invariably the case because the energy dissipated in an electric arc is transferred as heat to its surroundings. The resulting rapid increase in temperature then causes the pressure rise inside the transformer. Various devices have been suggested to prevent pressure rises in transformer tanks. It is know for instance, by Hill in U.S. Pat. No. 1,709,723 that a pressure relief can be provided by a rupture of a diaphragm in the casing of the transformer. However, a diaphragm will rupture whenever the pressure exeeds a certain predetermined level, moreover a diaphragm cannot differentiate between a slow pressure buildup and a fast pressure surge. In addition, a diaphragm such as shown by Hill cannot be prevented from undesirable rupturing caused by, for example, an increase in the ambient temperature and, is therefore, not suitable for use as an indicator of internal arcing faults.

It is known that there is a transient surge in pressure inside a transformer when an internal arcing fault occurs. This is invariably the case because arcing produces a marked increase in temperature which vaporizes some of the oil within the transformer.

SUMMARY OF THE INVENTION

It is an aim of the present invention to provide a warning indicator for a power transformer that is insensitive to pressure changes due to normal temperature variations and yet provides a positive indication of even a comparatively small transient pressure surge due to an internal arcing fault. The purpose of this indication is to positively identify an occurrence of internal faults, and to prevent potentially hazardous attempts by linemen to re-energize a faulty transformer, one that has had an internal arcing fault.

The present invention provides an internal arcing warning indicator for a transformer comprising an opening in a casing of the transformer; moveable piston means over the opening with retaining means to retain the piston means over the opening, the piston means having at least one small aperture therein to allow slow increases and decreases of pressure within the transformer to occur without the piston means moving a predetermined distance, and indicator means attached to the piston means, the indicator means providing an indication that the piston means has moved a predetermined distance, and retaining the indication until reset.

BRIEF DESCRIPTION OF THE DRAWINGS

In drawings which illustrate embodiments of the invention.

DETAILED DISCLOSURE OF THE INVENTION

Figure 1:
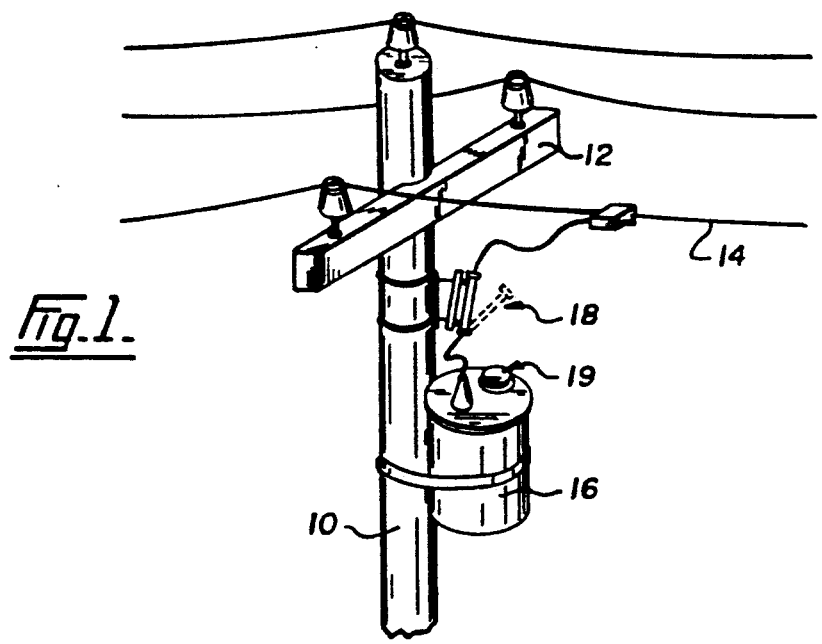
FIG. 1 is an elevational view showing a pole with a transformer mounted thereon.

Referring now to the drawings, FIG. 1 illustrates a distribution pole 10 with a cross piece 12 supporting power lines 14. A transformer 16 is mounted on the pole 10 and is connected via a fused cutout 18 to one of the lines 14. In the event of the fuse tripping, it hinges down as illustrated in FIG. 1 breaking the circuit between the transformer 16 and the line 14.

Figure 2:
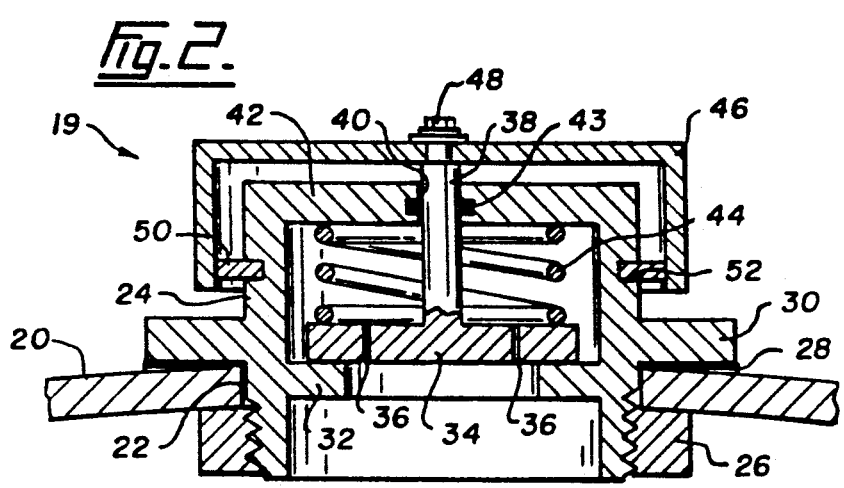
FIG. 2 is a detailed sectional view of an indicator for a transformer according to one embodiment of the present invention showing no arcing fault has occurred in the transformer.

As shown in FIG. 2, the transformer 16 has a casing 20 which encloses the transformer, and has an indicator 19 which fits into an opening 22 at the top of the casing 20. the indicator 19 has a flanged body member 24 with a lock nut 26 to hold the body member 24 in place. A weatherproof seal 28 is provided between an external flange 30 of the body member 24 and the casing 20. An internal flange 32 within the body member supports a piston 34 with a series of small apertures 36 therein to permit a small flow of gas to pass therethrough sufficient to equalize pressure on both sides of the piston 34. Thus small or slow changes in internal pressure within the casing 20 do not move the piston 34.

The piston 34 has a central stem 38 which extends up through a hole 40 in the cover 42 of the body member 24. A gasket 43 is provided in the hole 40 to prevent outside air entering the cover 42 and consequently entering the transformer. Outside air may have moisture therein which should not enter the transformer casing 20. A coiled spring 44 is positioned about the stem 38 between the piston 34 and the cover 42. The spring retains the piston 34 in position on the internal flange 32 of the body member 24.

On top of the stem 38 above the body member 24, a cup member 46 is provided attached to the stem by a bolt 48. The side or skirt of the cup member 46 extends down over the body member 24 and retains an indicator ring clip 50 in a groove 52 in the body member 24.

Whereas a spring 44 is shown herein, it will be apparent that a spring is not always essential. The weight of the piston 34, stem 38 and cup member 46 may be sufficient to hold the piston 34 in position. The piston 34 is guided so that a pressure surge in the transformer 16 raises the piston 34 so that the skirt of the cup member 46 is above the ring clip 50. The ring clip 50 springs out and indicates a pressure surge has occurred.

Figure 3:
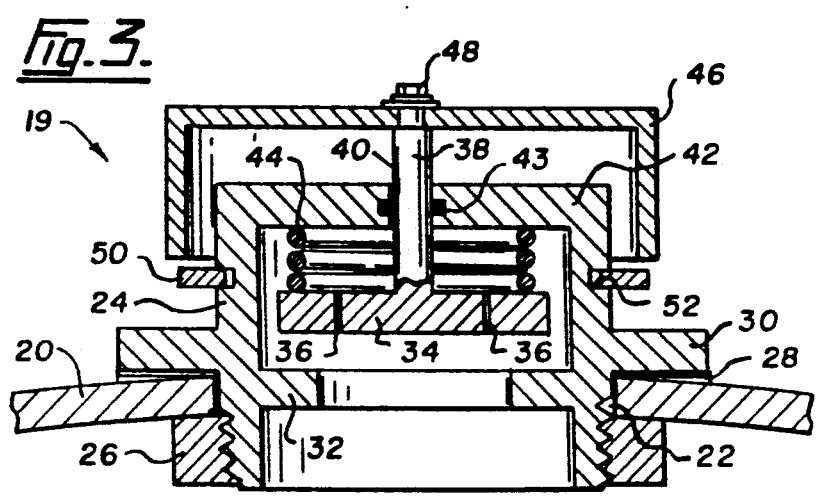
FIG. 3 is a detailed sectional view of the indicator shown in FIG. 2 which has tripped to show an arcing fault has occurred.

When the cup member 46 rises up above the ring clip 50, then the clip 50 opens out, as can be seen in FIG. 3, and prevents the cup member 46 from dropping back over the ring clip 50. The ring clip is brightly colored, such as a red color, so that it is clearly visible when the indicator has tripped. A lineman sees this ring clip when an external inspection occurs and immediately is aware that there has been a pressure surge in the transformer.

Because of the small apertures 36 in the piston 34, any increase or decrease in pressure in the casing 20 that may occur for a variety of reasons such as heating or cooling of the transformer in different weather conditions does not cause the piston 34 to move far enough for the skirt of the cup member 46 to expose the ring clip 50.

In operation, when there is an internal arcing fault within the transformer 16 a rapid increase in pressure results and the small apertures 36 in the piston 34 are not large enough to admit the sudden release of gas to balance the pressure on both sides of the piston 34. Thus, the piston 34 is driven upwards forcing the stem 38 up through the hole 38. The cup member 46 rises to release the spring clip 50, and the bright color on the spring clip 50 is visible from the ground. It may well be that the fused cutout 18 has also operated or the casing of the transformer has bulged which can clearly be seen by a lineman. However as soon as he sees the colored ring clip 50, he knows there had been a pressure surge in the transformer 16. If he sees the colored ring clip 50, then he knows that the fault is in the transformer, and he would not reset the fused cutout 18 until the transformer has been replaced.

Whereas cup member 46 and colored ring clip 50 type indicator device is shown herein, it will be apparent that this may be replaced with other types of visual indicators, for instance a needle that punctures a bag of dye within the casing to show a particular color effect. Alternatively a small flag-like object, rather like a parking meter can be removed from rest to a danger position. An electrical connection can be made to a remote indicator so that one is able to monitor the transformer pressure surge from a monitoring station remote from the transformer itself.

Various changes may be made to the embodiments shown herein without departing from the scope of the present invention with is limited only by the following claims.

The embodiments of the present invention in which an exclusive property or privelege is claimed are defined as follows:

1. An internal arcing warning indicator for a transformer comprising:
   an opening in a casing of the transformer;
   moveable piston means for sensing pressure surges due to internal arcing faults within the transformer, said piston means being mounted over the opening in the transformer casing and within means received in the opening to retain the piston means over the opening, the piston means having at least one aperture therein to allow slow increases and decreases of pressure within the transformer without the piston means moving a predetermined distance; and
   indicator means attached to the piston means and to the retaining means, for providing an indication that the piston means has moved a predetermined distance and for retaining the indication until reset.

2. The internal arcing warning indicator according to claim 1 wherein the retaining means includes at least one spring.

3. The internal arcing warning indicator according to claim 1 wherein the piston means has a stem passing through the retaining means, the stem attached to a cup member having a skirt that extends down over a colored indicator located on the retaining means when the piston means is retained over the opening and wherein the skirt rises up to expose the colored indicator when the piston means has moved the predetermined distance.

4. The internal arcing warning indicator according to claim 3 wherein the colored indicator is a ring clip which springs out when the skirt of the cup member rises above the ring clip, to prevent the skirt of the cup member from returning to cover the ring clip.

5. The internal arcing warning indicator according to claim 3 wherein the stem passes through a gasket in a hole in the retaining means to prevent air from entering the transformer.

* * * * *